US012753332B2

(12) United States Patent
Shin et al.

(10) Patent No.: US 12,753,332 B2
(45) Date of Patent: Oct. 6, 2026

(54) EPOXY ADHESIVE COMPOSITION FOR EASY SEPARATION FOR RECYCLING

(71) Applicants: Hyundai Motor Company, Seoul (KR); Kia Corporation, Seoul (KR); NOROO R&C Co, Ltd., Anyang (KR)

(72) Inventors: Sung Chul Shin, Incheon (KR); Jeong Su Bae, Chungcheongbuk-Ro (KR)

(73) Assignees: Hyundai Motor Company, Seoul (KR); Kia Corporation, Seoul (KR); NOROO R&C Co, Ltd., Anyang (KR)

( * ) Notice: Subject to any disclaimer, the term of this patent is extended or adjusted under 35 U.S.C. 154(b) by 75 days.

(21) Appl. No.: 18/819,091

(22) Filed: Aug. 29, 2024

(65) Prior Publication Data

US 2025/0243392 A1 Jul. 31, 2025

(30) Foreign Application Priority Data

Jan. 26, 2024 (KR) ........................ 10-2024-0011929

(51) Int. Cl.

*C09J 163/00* (2006.01)
*C09J 5/06* (2006.01)
*C09J 11/04* (2006.01)

(52) U.S. Cl.

CPC ............... *C09J 163/00* (2013.01); *C09J 5/06* (2013.01); *C09J 11/04* (2013.01); *C09J 2301/408* (2020.08); *C09J 2301/416* (2020.08); *C09J 2301/502* (2020.08)

(58) Field of Classification Search

CPC combination set(s) only.
See application file for complete search history.

(56) References Cited

U.S. PATENT DOCUMENTS

2011/0257285 A1* 10/2011 Barriau .............. C08G 59/4021
521/156

OTHER PUBLICATIONS

Ajicure AH300 a Fenuron derivative (Year: 2026).*
Dicyandiamide reactions (Year: 2026).*
Is acetylene black the same as carbon black (Year: 2026).*
Is dicyandiamide a type of blocked isocyanate (Year: 2026).*

* cited by examiner

*Primary Examiner* — Peter A Salamon
(74) *Attorney, Agent, or Firm* — Fox Rothschild LLP

(57) ABSTRACT

Disclosed is an epoxy adhesive composition for easy separation, in which articles using the epoxy adhesive composition are easy to separate and suitable for recycling.

20 Claims, No Drawings

EPOXY ADHESIVE COMPOSITION FOR EASY SEPARATION FOR RECYCLING

CROSS-REFERENCE TO RELATED APPLICATION

This application claims, under 35 U.S.C. § 119 (a), the benefit of Korean Patent Application No. 10-2024-0011929, filed on Jan. 26, 2024, the entire contents of which are incorporated herein by reference.

TECHNICAL FIELD

The present disclosure relates to an epoxy adhesive composition for easy separation, in which articles using the epoxy adhesive composition are easy to separate and suitable for recycling.

BACKGROUND

With the advancement of industry and improvement in living standards, generation of various types of waste is rapidly increasing and interest is focused on methods of treating waste, especially vehicle waste. End-of-life vehicles are delivered to junkyards, recovering recyclable parts, liquids such as fuel and oil that are hazardous during dismantling, and tires.

In order to achieve carbon neutrality, recycling parts and the like recovered from end-of-life vehicles is receiving attention. However, when separating the vehicle body for recycling, disassembly is difficult due to high adhesion of the adhesive.

Therefore, for recycling, there is a need to develop an adhesive in which sufficient adhesive strength is exhibited when used but adhesive strength is quickly decreased by external stimulation when necessary.

SUMMARY OF THE DISCLOSURE

An object of the present disclosure is to provide an epoxy adhesive composition that has high adhesive strength under actual use conditions but lowered adhesive strength when heated in a short time for easy recycling of adherends.

The objects of the present disclosure are not limited to the foregoing. The objects of the present disclosure will be able to be clearly understood through the following description and to be realized by the means described in the claims and combinations thereof.

An exemplary embodiment of the present disclosure provides an epoxy adhesive composition, including a main agent including an epoxy resin, an inorganic blowing agent, a block isocyanate resin, and acetylene black; and a curing agent.

The epoxy resin may include at least one selected from the group consisting of a bisphenol-based epoxy resin, a urethane-modified epoxy resin, a silane-modified epoxy resin, a phenol-modified epoxy resin, and combinations thereof.

The inorganic blowing agent may include thermally expandable microcapsules.

The inorganic blowing agent may have a maximum blowing temperature of 150° C. to 160° C.

The block isocyanate may have a dissociation temperature of 130° C. to 140° C. The acetylene black may have an average particle diameter of 30 nm to 40 nm.

The acetylene black has plasticizer oil absorption of 85 mg/g to 100 mg/g.

The main agent may include 55 wt % to 77 wt % of the epoxy resin, 10 wt % to 20 wt % of the inorganic blowing agent, 10 wt % to 25 wt % of the block isocyanate resin, and 1 wt % to 3 wt % of the acetylene black.

The epoxy adhesive composition may include the main agent and the curing agent in a mass ratio of 1:0.5 to 1:1.

In certain preferred aspects, separation strength of the epoxy adhesive composition is about 2 MPa or less when heated.

In certain preferred aspects, the main agent suitably comprises: i) about 55 wt % to about 77 wt % of the epoxy resin; ii) up to about 15 wt % of the inorganic blowing agent; iii) about 15 wt % to about 20 wt % of the block isocyanate resin; iv) and about 1 wt % to about 3 wt % of the acetylene black.

In certain preferred aspects, wherein separation strength of the epoxy adhesive composition is about 0.5 MPa or less when heated.

In certain preferred aspects, the epoxy adhesive composition comprises the main agent and the curing agent in a mass ratio of about 1:0.5 to about 1:1.

In certain preferred aspects, the main agent further comprises an additive. For example, a bonding agent and/or a filler.

In certain preferred aspects. the curing agent comprises a curing resin, a curing catalyst, and an additive.

In certain preferred aspects, the curing agent comprises a polyamide resin and a polyamine resin.

In certain preferred aspects, the epoxy adhesive composition does not contain (or contain less than 1, 0.5, 0.3, 0.2, 0.1 weight percent based on total weight of the composition) of carbon black (including general carbon black) and/or nanographene, i.e. carbon black (including general carbon black) and/or nanographene is substantially or completely excluded from the epoxy adhesive composition.

Another exemplary embodiment of the present disclosure provides a method of separating an epoxy adhesive composition including applying a heat source to the epoxy adhesive composition.

The heat source may be for example a microwave. 19. The method of claim 18, wherein the heat source is a microwave, a dry oven, high-frequency induction, or lasers, or other heating source. In certain preferred aspects, the heat source is a microwave.

Other aspects are disclosed infra.

DETAILED DESCRIPTION

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be understood that the terms “comprise”, “include”, “have”, etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being “on” another element, it may be directly on the other element, or intervening elements may be present therebetween. Similarly, when an element such as a layer, film, area, or sheet is referred to as being "under" another element, it may be directly under the other element, or intervening elements may be present therebetween.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

The term "filler" as used herein refers to a material added to a matrix or an admixture to improve properties but not to react or be reactive with any other compounds or chemicals in a surrounding matrix or admixture. The filler may be in a form of particles, fibers, or resin, and preferably, the filler may be particles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

An epoxy adhesive composition according to the present disclosure may include a room-temperature curable two-component adhesive composition including a main agent and a curing agent.

The main agent may include an epoxy resin, an inorganic blowing agent, a block isocyanate resin, and acetylene black.

The present disclosure is characterized in that an inorganic blowing agent and a block isocyanate resin, which may reduce adhesion of an adhesive due to behavior such as expansion, dissociation, etc. by external stimuli such as heat, electricity, etc., are included in the main agent. In addition, the present disclosure is characterized in that acetylene black is included in the main agent so that the epoxy adhesive composition may quickly reach a temperature at which the inorganic blowing agent and the block isocyanate resin exhibit expansion or dissociation behavior.

The epoxy resin may include at least one selected from the group consisting of a bisphenol-based epoxy resin, a urethane-modified epoxy resin, a silane-modified epoxy resin, a phenol-modified epoxy resin, and combinations thereof.

The type of bisphenol-based epoxy resin is not particularly limited. Examples of the bisphenol-based epoxy resin may include bisphenol A-type epoxy resin, bisphenol F-type epoxy resin, bisphenol S-type epoxy resin, bisphenol A novolac-type epoxy resin, bisphenol F novolac-type epoxy resin, glycidyl amine-type epoxy resin, terminal amine-modified epoxy resin, and the like.

The type of urethane-modified epoxy resin is not particularly limited. Examples of the urethane-modified epoxy resin may include UME-305, UME-330, and the like, available from Kukdo Chemical.

The type of silane-modified epoxy resin is not particularly limited. For example, the silane-modified epoxy resin may be configured such that a silane group is attached to an epoxy resin. The silane group may include an alkoxy silane group represented by Chemical Formula 1 below.

$(R_2)_n$—$Si(R_1)_3$ [Chemical Formula 1]

In Chemical Formula 1, each $R_1$ may independently include an alkyl group having 1 to 6 carbon atoms or an alkoxy group having 1 to 6 carbon atoms. Also, n may be 0 or 1, and $R_2$ may include an alkyl group having 1 to 10 carbon atoms or an alkylene group having 1 to 10 carbon atoms.

The type of phenol-modified epoxy resin is not particularly limited. For example, the phenol-modified epoxy resin may be an epoxy resin modified with a phenol-based compound. The phenol-based compound is not particularly limited and may include any compound commonly used in the technical field to which the present disclosure belongs.

The epoxy resin may include the bisphenol-based epoxy resin, the urethane-modified epoxy resin, the silane-modified epoxy resin, and the phenol-modified epoxy resin in a mass ratio of 1:0.3-0.7:0.9-1.1:0.1-0.3. When the composition ratio of the epoxy resin falls within the above range, main properties of the epoxy adhesive composition, such as room-temperature adhesive strength, tensile strength, shear strength, and heat aging resistance, may be sufficiently attained.

The inorganic blowing agent may include thermally expandable microcapsules. The thermally expandable microcapsules may be configured such that a blowing agent such as liquid hydrocarbon is placed in a shell containing a thermoplastic resin. The thermally expandable microcapsules may be a heating expandable blowing agent in which the blowing agent inside vaporizes when heated, thereby increasing internal pressure and expanding volume accordingly.

The inorganic blowing agent may have an average particle size D50 of 10 μm to 16 μm. When the average particle size D50 of the inorganic blowing agent falls within the above range, separation strength when heated may be sufficiently lowered without damage to adhesive strength of the epoxy adhesive composition.

The inorganic blowing agent may have an expansion start temperature of 120° C. to 130° C. and a maximum blowing temperature of 150° C. to 160° C. The expansion start temperature may be a temperature at which the inorganic blowing agent begins to expand, and the maximum blowing temperature may be a temperature at which the inorganic blowing agent expands to a maximum volume. If the maximum blowing temperature of the inorganic blowing agent is less than 150° C., separation strength of the epoxy adhesive composition may not be sufficiently lowered because the inorganic blowing agent expands to a maximum volume before softening of the epoxy adhesive composition. On the other hand, if the maximum blowing temperature of the inorganic blowing agent exceeds 160° C., the inorganic blowing agent may not expand even when heated, so there may be no effect of lowering separation strength of the epoxy adhesive composition.

The block isocyanate resin may be configured such that an isocyanate group is blocked so that an isocyanate group (—NCO) does not react with a hydroxyl group (—OH), an amine group ($NH_2$), etc. at room temperature. When the block isocyanate resin reaches a predetermined temperature, the blocking agent may be dissociated and the isocyanate group may be activated, followed by curing with heat generation by reaction with amine.

The block isocyanate resin may be configured such that some or all of isocyanate groups contained in the isocyanate resin are blocked with a blocking agent.

The type of blocking agent is not particularly limited. Examples of the blocking agent may include phenol, ε-caprolactam, methyl ethyl ketone oxime, 2,4-dichlorophenol, 1,2-pyrazole, diethyl malonate, diisopropylamine, triazole, imidazole, 3,5-dimethylpyrazole, and the like.

The type of isocyanate resin is not particularly limited. Examples of the isocyanate resin may include toluene-2,4-diisocyanate, 2,4-trilene diisocyanate, 2,6-trilene diisocyanate, hydrogenated trilene diisocyanate, isophorone diisocyanate, 1,3-xylene diisocyanate, 1,4-xylene diisocyanate, diphenylmethane-4,4-diisocyanate, 1,3-bisisocyanatomethyl cyclohexane, tetramethylxylene diisocyanate, 1,5-naphthalene diisocyanate, hexamethylene diisocyanate, 2,2,4-trimethyl hexamethylene diisocyanate, 2,4,4-trimethyl hexamethylene diisocyanate, trimethylolpropane modified toluene diisocyanate, trimethylolpropane modified tolylene diisocyanate, trilene diisocyanate adducts of trimethylolpropane, xylene diisocyanate adducts of trimethylolpropane, triphenylmethane triisocyanate, methylene bistriisocyanate, and the like.

The block isocyanate resin may have a dissociation temperature of 130° C. to 140° C. The dissociation temperature may be a temperature at which the blocking agent of the block isocyanate resin dissociates. If the dissociation temperature of the block isocyanate resin is less than 130° C., the block isocyanate resin may dissociate before expansion of the inorganic blowing agent, and the extent of lowering separation strength may decrease with an increase in adhesive strength of the epoxy adhesive composition. On the other hand, if the dissociation temperature of the block isocyanate resin exceeds 140° C., the epoxy adhesive composition may not soften, which may inhibit the effect of lowering separation strength due to the inorganic blowing agent.

The acetylene black is a type of carbon black and may be obtained by thermal decomposition of acetylene.

The acetylene black may have an average particle diameter of 30 nm to 40 nm. If the average particle diameter of acetylene black is less than 30 nm, plasticizer oil absorption may increase and viscosity of the epoxy adhesive composition may increase. On the other hand, if it exceeds 40 nm, voids between particles may increase and thermal conductivity may decrease.

The acetylene black may have plasticizer oil absorption of 85 mg/g to 100 mg/g. Here, plasticizer oil absorption may be a value measured using a plasticizer oil absorption meter. For example, plasticizer oil absorption may be determined by placing a sample in a meter, adding a plasticizer dropwise with kneading, measuring the amount of added plasticizer when the torque during kneading increases and decreases to 70% of the maximum torque, and dividing the same by the weight of the sample. If the plasticizer oil absorption of acetylene black is less than 85 mg/g, viscosity of the epoxy adhesive composition may decrease, hardness may increase, and elongation may decrease. On the other hand, if the plasticizer oil absorption of acetylene black exceeds 100 mg/g, viscosity of the epoxy adhesive composition may increase, hardness may decrease, and adhesive strength at room temperature may decrease.

The main agent may include 55 wt % to 77 wt % of the epoxy resin, 10 wt % to 20 wt % of the inorganic blowing agent, 10 wt % to 25 wt % of the block isocyanate resin, and 1 wt % to 3 wt % of the acetylene black. When the amounts of the inorganic blowing agent, block isocyanate resin, and acetylene black fall within the above ranges, separation strength when heated may be sufficiently lowered without decreasing adhesive strength at room temperature.

The main agent may further include an additive such as a bonding agent, a filler, etc.

The type of bonding agent is not particularly limited. An example of the bonding agent may include a modified vinyl bonding agent. The main agent may include 10 wt % to 15 wt % of the bonding agent. If the amount of the bonding agent is less than 10 wt %, adhesive strength of the epoxy adhesive composition may decrease, whereas if it exceeds 15 wt %, water resistance and heat-cycle adhesive strength may decrease.

The type of filler is not particularly limited. An example of the filler may include calcium carbonate ($CaCO_3$). The main agent may include 5 wt % to 10 wt % of the filler. If the amount of the filler is less than 5 wt %, specific gravity of the epoxy adhesive composition may decrease, whereas if it exceeds 10 wt %, flowability of the epoxy adhesive composition may decrease.

The curing agent may include a curing resin, a curing catalyst, and an additive.

The curing resin may include a polyamide resin and a polyamine resin.

The type of polyamide resin is not particularly limited. For example, the polyamide resin may have an activated hydrogen equivalent of 160 g/mol to 180 g/mol.

The type of polyamine resin is not particularly limited. Examples of the polyamine resin may include amidoamine, phenalkamine, polyetheramine, and the like.

The type of curing catalyst is not particularly limited. Examples of the curing catalyst may include tertiary amines such as DMP-30.

The additive may include a flow regulator, a filler such as calcium carbonate, etc.

The curing agent may include 55 wt % to 75 wt % of the curing resin, 0.3 wt % to 0.5 wt % of the curing catalyst, 1 wt % to 3 wt % of the flow regulator, and 20 wt % to 25 wt % of the filler. If the amount of the curing resin is less than 55 wt %, the curing speed may be high and adhesive strength of the epoxy adhesive composition may decrease, whereas if it exceeds 75 wt %, the curing speed may be low and adhesive strength at room temperature may decrease due to lowered hardness. If the amount of the curing catalyst is less than 0.3 wt %, the curing speed may be low, whereas if it exceeds 0.5 wt %, storage stability may deteriorate. If the amount of the flow regulator is less than 1 wt %, flowability of the epoxy adhesive composition may deteriorate, whereas if it exceeds 3 wt %, viscosity of the epoxy adhesive composition may decrease. If the amount of the filler is less than 20 wt %, working performance may decrease, whereas if it exceeds 25 wt %, viscosity of the epoxy adhesive composition may become too high.

The epoxy adhesive composition may include the main agent and the curing agent in a mass ratio of 1:0.5 to 1:1. When the mass ratio of the main agent and the curing agent falls within the above range, the epoxy adhesive composition may be cured at an appropriate temperature and may exhibit excellent adhesive strength.

The epoxy adhesive composition according to the present disclosure is capable of bonding a variety of substrates, including wood, metal, coated metal, aluminum, various plastic and filled plastic substrates, fiberglass, and the like. In a preferred embodiment, the epoxy adhesive composition is used to bond vehicle parts or to bond the vehicle parts to a vehicle body. Examples of the vehicle parts may include steel, coated steel, galvanized steel, aluminum, coated aluminum, plastic and filled plastic substrates.

Since the epoxy adhesive composition according to the present disclosure has excellent aging resistance at a high temperature of about 100° C., it may maintain high adhesive strength without separation under actual use conditions.

In addition, a method of separating the epoxy adhesive composition according to the present disclosure may include applying a heat source to the epoxy adhesive composition used as described above. The type of heat source is not particularly limited and may be, for example, a microwave, a dry oven, high-frequency induction, lasers, etc., preferably a microwave. A microwave that is capable of reaching a high temperature in a short time may have a low possibility of material deformation and may be used on relatively large parts.

The epoxy adhesive composition according to the present disclosure has separation strength of 2.0 MPa or less, 1.0 MPa or less, 0.5 MPa or less, 0.3 MPa or less, or 0 MPa when heated, so when irradiated with microwaves, the adherend attached by the epoxy adhesive composition may be easily disassembled and separated and thus recycled.

A better understanding of the present disclosure may be obtained through the following examples and comparative examples. These examples are not to be construed as limiting the scope of the present disclosure.

EXAMPLES

A main agent was prepared by mixing an epoxy resin, an inorganic blowing agent, a block isocyanate resin (Block NCO), and acetylene black (AB) in the amounts shown in Table 1 below. As the epoxy resin, a mixture of bisphenol A-type epoxy resin, urethane-modified epoxy resin, silane-modified epoxy resin, and phenol-modified epoxy resin was used. AkzoNobel 031 DU 40 was used as the inorganic blowing agent. NOROO R&C N-0199 was used as the block isocyanate resin. Denka Korea A/B was used as the acetylene black.

A curing agent including a curing resin containing polyamide resin and polyamine resin, and a curing catalyst was prepared.

An epoxy adhesive composition was prepared by mixing the main agent and the curing agent, after which properties of the epoxy adhesive composition were measured by the following methods.

1) Tensile Strength and Elongation

Measurement was performed according to KS M ISO527-2 (tensile properties of plastic). Here, the thickness of a specimen was 2 mm to 3 mm, and the tensile speed was evaluated at 5 mm/min.

2) Shear Strength

The epoxy adhesive composition was applied at a width of 12.5 mm onto the end of 100×25×0.8 t painted steel (steel plate manufactured in the same way as vehicle body paint). The same painted steel plate was stacked on top so that only the relevant areas overlap. The resulting stack was fixed with clamps and left under the following aging conditions, after which the maximum load was determined by tension at a speed of 5 mm/min using a tensile tester.

Room temperature (standard state): Leaving at room temperature for 168 hours

Water resistance: leaving at room temperature for 168 hours→immersion in water at 40° C. for 168 hours→leaving at room temperature for 1 hour Heat aging: leaving at room temperature for 168 hours→heating at 80° C. for 337 hours→leaving at room temperature for 1 hour Heat cycle: leaving at room temperature for 168 hours→5 cycles (1 cycle: heating at 80° C. for 3 hours→leaving at room temperature for 1 hour→heating at 30° C. for 3 hours→leaving at room temperature for 1 hour→heating at 50° C. and 95% relative humidity for 15 hours→leaving at room temperature for 1 hour) →leaving at room temperature for 1 hour Separation strength: leaving at room temperature for 168 hours→application of 10 A microwaves for 7 minutes→leaving at room temperature for 1 hour 100° C. aging: leaving at room temperature for 168 hours→heating to 100° C. for 1 hour→leaving at room temperature for 1 hour Shear strength of Examples with different amounts of the inorganic blowing agent, block isocyanate resin, and acetylene black is shown in Table 1 below.

TABLE 1

| | Amount of main agent[1] [wt %] | | | Adhesion [MPa][2] | | Temperature of steel plate upon |
|---|---|---|---|---|---|---|
| Classification | Inorganic blowing agent | Block NCO | AB | Room temperature (standard state) | Separation strength | application of heat source [° C.] |
| 1 | 10 | 15 | 1 | 20.9 | 1.7 | 172 |
| 2 | | | 2 | 20.7 | 1.5 | 175 |
| 3 | | | 3 | 20.8 | 1.0 | 178 |
| 4 | | 20 | 1 | 20.7 | 1.6 | 173 |
| 5 | | | 2 | 20.6 | 1.5 | 174 |
| 6 | | | 3 | 20.5 | 1.0 | 175 |
| 7 | 15 | 10 | 1 | 20.3 | 0.8 | 172 |
| 8 | | | 2 | 20.0 | 0.5 | 173 |
| 9 | | | 3 | 20.1 | 0.3 | 175 |
| 10 | | 15 | 1 | 19.4 | 0 | 180 |
| 11 | | | 2 | 18.5 | 0 | 188 |
| 12 | | | 3 | 16.5 | 0 | 193 |
| 13 | | 20 | 1 | 18.9 | 0 | 182 |
| 14 | | | 2 | 17.2 | 0 | 191 |
| 15 | | | 3 | 16.3 | 0 | 195 |
| 16 | | 25 | 1 | 16.5 | 0 | 187 |
| 17 | | | 2 | 16.3 | 0 | 189 |
| 18 | | | 3 | 16.3 | 0 | 195 |
| 19 | 20 | 15 | 1 | 16.3 | 0 | 182 |
| 20 | | | 2 | 16.7 | 0 | 185 |
| 21 | | | 3 | 15.9 | 0 | 189 |
| 22 | | 20 | 1 | 15.5 | 0 | 186 |
| 23 | | | 2 | 15.3 | 0 | 189 |
| 24 | | | 3 | 15.2 | 0 | 190 |

[1]including the remainder of epoxy resin

[2]shear strength represented as adhesion

Referring to Table 1, Examples exhibited shear strength of 15 MPa or more at room temperature and separation strength of 2.0 MPa or less. In particular, Example 10 including 15 wt % of the inorganic blowing agent, 15 wt % of the block isocyanate resin, and 1 wt % of acetylene black had shear strength of 19.4 MPa at room temperature and separation strength of 0 MPa, showing the best results.

The other properties of Example 10 are shown in Table 2 below.

TABLE 2

| Items | | | Requirements | Example 10 |
|---|---|---|---|---|
| Hardness | | | 70 ± 10 | 70 |
| Tensile strength [MPa] | | | 17 MPa or more | 18.7 |
| Shear strength | Standard state [MPa] | Curing at room temperature | 17 MPa or more | 19.4 |
| | | Curing at 80° C. | 17 MPa or more | 18.9 |
| | Water resistance [MPa] | | 17 MPa or more | 18.4 |
| | Heat aging [MPa] | | 17 MPa or more | 20.5 |
| | Heat cycle [MPa] | | 17 MPa or more | 19.5 |
| | Separation strength [MPa] | | 0.2 MPa or less | 0 |

TABLE 2-continued

| Items | Requirements | Example 10 |
|---|---|---|
| 100° C. aging [%] | Reduction of 10% or less compared to standard | 8.2 |

Comparative Examples

A main agent was prepared by adding, to the same epoxy resin as in Examples, an inorganic blowing agent, a block isocyanate resin, acetylene black, general carbon black (average particle diameter: 28 μm, plasticizer oil absorption: 55 cc/100 g), and nanographene (average particle diameter: 20-167 μm) in the amounts shown in Table 3 below.

After preparing the same curing agent as in Examples, an epoxy adhesive composition was prepared by mixing the main agent and the curing agent in the same mass ratio as in Examples.

Shear strength of the epoxy adhesive composition was measured and is shown in Table 3 below.

TABLE 3

| Classification | Amount of main agent[3] [wt %] | | Adhesion [MPa][4] Room temperature (standard state) | Separation strength | Temperature of steel plate upon application of heat source [° C.] |
|---|---|---|---|---|---|
| 1 | Inorganic | 10 | 21.8 | 10.6 | 127 |
| 2 | blowing | 15 | 23.2 | 9.7 | 127 |

TABLE 3-continued

| Classification | Amount of main agent[3] [wt %] | | Adhesion [MPa][4] Room temperature (standard state) | Separation strength | Temperature of steel plate upon application of heat source [° C.] |
|---|---|---|---|---|---|
| 3 | agent | 20 | 23.0 | 8.5 | 127 |
| 4 | Block NCO | 10 | 19.6 | 19.6 | 130 |
| 5 | | 15 | 17.8 | 18.4 | 130 |
| 6 | Acetylene | 1 | 26.9 | 27.5 | 140 |
| 7 | black | 3 | 22.8 | 28.9 | 140 |
| 8 | General carbon black | 3 | 16.4 | 22.4 | 138 |
| 9 | Nanographene | 0.2 | 26.4 | 27.4 | 120 |
| 10 | | 1 | 24.4 | 26.7 | 130 |

[3]including the remainder of epoxy resin
[4]shear strength represented as adhesion Referring to Table 3, separation strength could not be lowered when the inorganic blowing agent, block isocyanate resin, acetylene black, general carbon black, and nanographene were added alone rather than in combination. Specifically, in Comparative Examples 1 to 3, separation strength was slightly lowered, but not sufficiently, and in Comparative Examples 4 to 10, there was an effect of promoting heat conduction, but due to excellent heat resistance of the epoxy resin, when the block isocyanate resin was applied alone, separation strength was not lowered simply by increasing the temperature.

A main agent was prepared by adding the inorganic blowing agent that was most effective in the above results, as an essential ingredient, to the same epoxy resin as in Examples, and adding a block isocyanate resin, acetylene black, general carbon black, and nanographene in the amounts shown in Table 4 below.

After preparing the same curing agent as in Examples, an epoxy adhesive composition was prepared by mixing the main agent and the curing agent in the same mass ratio as in Examples.

Shear strength of the epoxy adhesive composition was measured and is shown in Table 4 below.

TABLE 4

| Classification | Amount of main agent[5] [wt %] | | | Adhesion [MPa][6] Room temperature (standard state) | Separation strength | Temperature of steel plate upon application of heat source [° C.] |
|---|---|---|---|---|---|---|
| 11 | Inorganic | Block NCO | 20 | 20.8 | 4.0 | 147 |
| 12 | blowing agent | Acetylene black | 1 | 18.9 | 4.7 | 135 |
| 13 | 15 wt % | General carbon black | 1 | 20.0 | 17.2 | 125 |
| 14 | | Nanographene | 1 | 24.5 | 23.2 | 130 |

[5]including the remainder of epoxy resin
[6]shear strength represented as adhesion Referring to Table 4, the combination of the inorganic blowing agent and block isocyanate resin in Comparative Example 11 and the combination of the inorganic blowing agent and acetylene black in Comparative Example 12 showed an effect of lowering separation strength, which was not yet sufficient. On the other hand, general carbon black and nanographene of Comparative Examples 13 and 14 showed almost no effect of lowering separation strength even when mixed with the inorganic blowing agent.

Based on the results of Examples and Comparative Examples, it can be concluded that, in order to lower separation strength, an inorganic blowing agent, a block isocyanate resin, and acetylene black have to be used in combination in appropriate amounts.

According to the present disclosure, for easy recycling of adherends, it is possible to obtain an epoxy adhesive composition that has high adhesive strength under actual use conditions but lowered adhesive strength when heated in a short time.

The epoxy adhesive composition according to the present disclosure enables easy recycling of adherends, thereby complying with environmental regulations, contributing to a carbon-neutral society, and reducing recycling and/or reuse costs.

The effects of the present disclosure are not limited to the above-mentioned effects. It should be understood that the effects of the present disclosure include all effects that can be inferred from the description of the present disclosure.

Although the embodiments have been described as limited examples as described above, various modifications and variations are possible by those skilled in the art from the above description. For example, appropriate results may be achieved even if the described techniques are performed in a different order from the described method, and/or even if the described components are coupled or combined in a different form from the described method, or replaced or substituted by other components or equivalents. Therefore, other implementations, other embodiments, and equivalents to the claims also fall within the scope of the claims described below.

What is claimed is:

1. An epoxy adhesive composition, comprising:

a main agent comprising an epoxy resin, an inorganic blowing agent, a block isocyanate resin, and acetylene black; and a curing agent.

2. The epoxy adhesive composition of claim 1, wherein the epoxy resin comprises at least one selected from the group consisting of a bisphenol-based epoxy resin, a urethane-modified epoxy resin, a silane-modified epoxy resin, a phenol-modified epoxy resin, and combinations thereof.

3. The epoxy adhesive composition of claim 1, wherein the inorganic blowing agent comprises thermally expandable microcapsules.

4. The epoxy adhesive composition of claim 1, wherein the inorganic blowing agent has a maximum blowing temperature of about 150° C. to about 160° C.

5. The epoxy adhesive composition of claim 1, wherein the block isocyanate has a dissociation temperature of about 130° C. to about 140° C.

6. The epoxy adhesive composition of claim 1, wherein the acetylene black has an average particle diameter of about 30 nm to about 40 nm.

7. The epoxy adhesive composition of claim 1, wherein the acetylene black has a plasticizer oil absorption of about 85 mg/g to about 100 mg/g.

8. The epoxy adhesive composition of claim 1, wherein the main agent comprises:

about 55 wt % to about 77 wt % of the epoxy resin, about 10 wt % to about 20 wt % of the inorganic blowing agent, about 10 wt % to about 25 wt % of the block isocyanate resin, and about 1 wt % to about 3 wt % of the acetylene black.

9. The epoxy adhesive composition of claim 8, wherein separation strength of the epoxy adhesive composition is about 2 MPa or less when heated.

10. The epoxy adhesive composition of claim 1, wherein the main agent comprises:

about 55 wt % to about 77 wt % of the epoxy resin, up to about 15 wt % of the inorganic blowing agent, about 15 wt % to about 20 wt % of the block isocyanate resin, and about 1 wt % to about 3 wt % of the acetylene black.

11. The epoxy adhesive composition of claim 10, wherein separation strength of the epoxy adhesive composition is about 0.5 MPa or less when heated.

12. The epoxy adhesive composition of claim 1, wherein the epoxy adhesive composition comprises the main agent and the curing agent in a mass ratio of about 1:0.5 to about 1:1.

13. The epoxy adhesive composition of claim 1, wherein the main agent further comprises an additive.

14. The epoxy adhesive composition of claim 13, wherein the additive comprises a bonding agent or a filler.

15. The epoxy adhesive composition of claim 1, wherein the curing agent comprises a curing resin, a curing catalyst, and an additive.

16. The epoxy adhesive composition of claim 1, wherein the curing agent comprises a polyamide resin and a polyamine resin.

17. The epoxy adhesive composition of claim 1, excluding general carbon black and/or nanographene.

18. A method of separating an epoxy adhesive composition comprising applying a heat source to the epoxy adhesive composition of claim 1.

19. The method of claim 18, wherein the heat source is a microwave, a dry oven, high-frequency induction, or lasers.

20. The method of claim 18, wherein the heat source is a microwave.

* * * * *